UNITED STATES PATENT OFFICE.

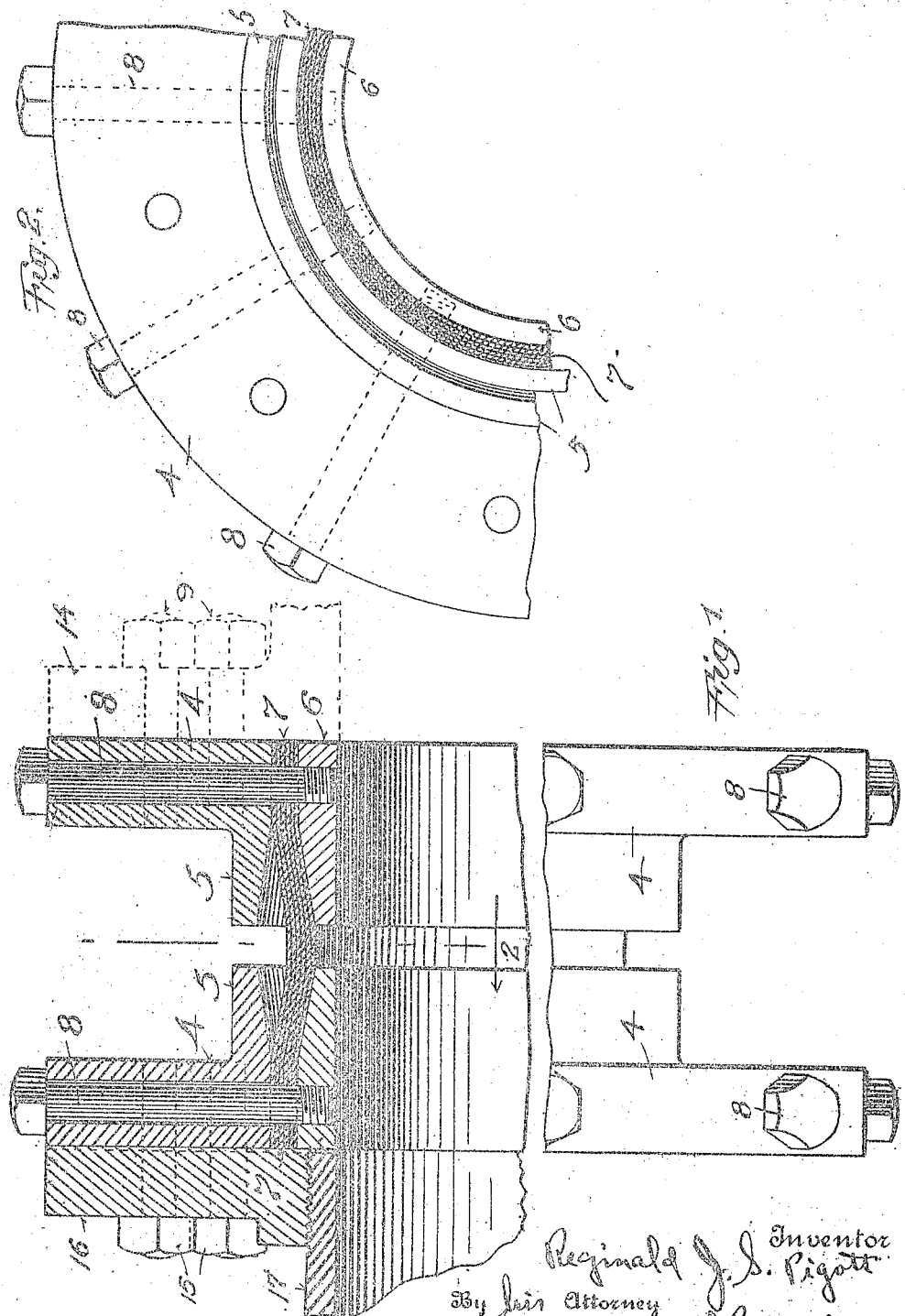

REGINALD J. S. PIGOTT, OF BRIDGEPORT, CONNECTICUT.

EXPANSION-JOINT.

1,255,631.  Specification of Letters Patent.  Patented Feb. 5, 1918.

Application filed July 19, 1916. Serial No. 110,119.

*To all whom it may concern:*

Be it known that I, REGINALD J. S. PIGOTT, a citizen of the United States, and resident of Bridgeport, county of Fairfield, State of Connecticut, have made a certain new and useful Invention in Expansion-Joints, of which the following is a specification.

This invention relates to expansion joints.

The object of the invention is to provide an expansion joint which is simple in structure, efficient in operation, and economical of manufacture.

A further object of the invention is to provide an expansion joint for connecting pipe lines which allows a great degree of flexibility between the respective pipe ends.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawings:—

Figure 1 is a view in side elevation, partly in vertical section, of an applied joint embodying my invention.

Fig. 2 is a sectional view taken on the line 2—2, Fig. 1, and looking in the direction of the arrows.

The same part is designated by the same reference numeral wherever it occurs throughout the several views.

In various types of expansion joints such as metallic expansion joints, the packed expansion joints are not applicable for some uses, due to the fact that they form too stiff a joint and allow insufficient flexibility between the pipe ends. This is especially true in large piping systems used in connection with steam turbines where the condenser is suspended directly from the turbine, and moved with the expansion of the turbine by heat.

It is among the special purposes of my present invention to provide an expansion joint which is applicable in the above case and in any case where ready flexibility is desired or necessary.

In accordance with my invention, I provide two flanges 4, preferably of cast metal and circular in shape. The flanges 4 have laterally extending sleeves 5, opposed to each other, as shown, and beveled away from the central axis thereof on its under surface. A pair of rings 6 are provided, with outer, opposed, surfaces beveled toward the central axis thereof, as shown. A seamless tube, 7, preferably of rubber reinforced with duck, is inserted between the rings 6 and the flange 4, and is compressed tight therein by means of tap bolts 8, which pass through the flange 4, tube 7, and sleeve 6, as clearly shown. The bolts 8 are radial and as many of them may be employed as desired or necessary. In practice, I prefer to space them equally around the flange 4, between the flange bolts 9.

It will be seen that the tap bolts hold the respective parts together in a water tight condition, and that the sleeve portions 5 of the flanges 4, together with the beveled shaped sleeves or rings 6, form a protection against undue straining outward of the rubber tube by pressure in the interior of the pipe, and inwardly by a vacuum inside of the pipe, respectively.

The flanges 4 are secured to the standard cast pipes 14 and 17 and the screw flange 16, respectively by the flange bolts 9 and 15.

While I have shown and described the tube 7 as being a composition of rubber and duck, it is to be understood that my invention in its broad scope, as defined in the claims, is not to be limited thereto, as any substance or composition which is water tight or air tight, and flexible, may be readily substituted.

Having now set forth the object and nature of my invention, and a structure embodying the principles thereof, what I claim as new and useful, and of my own invention, and desire to secure by Letters Patent, is,—

1. An expansion joint for connecting pipes comprising a ring with a beveled exterior surface and a flange adapted to surround said ring with a beveled interior surface, a flexible tube surrounding said ring and interposed between said ring and said flange, and means passing through said ring, tubing and flange for clamping said tube, ring and flange together.

2. An expansion joint for connecting pipes comprising a ring with a beveled exterior surface and a flange adapted to surround said ring with a beveled interior surface, a flexible tube surrounding said ring and interposed between said ring and said flange and radially extending bolts passing through said ring, tubing and flange for clamping the same together.

3. An expansion joint for connecting pipes comprising a pair of rings each beveled on its exterior surface with the ends thereof of least diameter opposed to each other, a pair of flanges, each of said flanges surround one of said rings and beveled on its interior surface, and a single flexible tube interposed between said rings and flanges and means for clamping said flanges, rings and said tube together to allow free movement of said tube between the beveled surfaces of said rings and flanges substantially as shown and described.

4. An expansion joint for connecting pipes comprising a pair of rings each beveled on its exterior surface with the ends thereof of least diameter opposed to each other, a pair of flanges, each of said flanges surrounding one of said rings and beveled on its interior surface, and a single flexible tube interposed between said rings and flanges and radially extending bolts for clamping said flanges, rings and said tube together to allow free movement of said tube between the beveled surfaces of said rings and flanges substantially as shown and described.

In testimony whereof I have hereunto set my hand on this 12th day of July A. D. 1916.

REGINALD J. S. PIGOTT